United States Patent [19]

Caddy et al.

[11] 4,394,147
[45] Jul. 19, 1983

[54] INTERNALLY SUPPORTED FILTER

[75] Inventors: John A. Caddy; William A. Putman, both of Louisville, Ky.

[73] Assignee: Allis-Chalmers Corporation, Milwaukee, Wis.

[21] Appl. No.: 325,756

[22] Filed: Nov. 30, 1981

[51] Int. Cl.³ .................................................. B01D 46/10
[52] U.S. Cl. ...................................... 55/357; 55/482; 55/491; 55/492; 55/524
[58] Field of Search ................. 55/357, 482, 491, 492, 55/524; 16/125

[56] References Cited

U.S. PATENT DOCUMENTS

| | | | |
|---|---|---|---|
| 1,854,677 | 4/1932 | Umensetter | 55/357 |
| 1,874,734 | 8/1932 | Bacon | 55/492 |
| 1,875,121 | 8/1932 | Olson | 16/125 X |
| 2,011,747 | 8/1935 | Bechik | 16/125 X |
| 2,478,054 | 8/1949 | Ray et al. | 55/357 X |
| 2,771,154 | 11/1956 | Gonzalez | 55/357 |
| 3,002,584 | 10/1961 | Jerabek et al. | 55/482 X |
| 3,031,827 | 5/1962 | Onstad et al. | 55/492 X |
| 3,388,535 | 6/1968 | Nash | 55/524 X |
| 3,520,416 | 7/1970 | Keedwell | 55/524 X |
| 3,877,909 | 4/1975 | Hansen | 55/491 X |
| 4,247,316 | 1/1981 | Putman | 55/357 |
| 4,255,175 | 3/1981 | Wilkins | 55/357 |

Primary Examiner—Kathleen J. Prunner
Attorney, Agent, or Firm—Thomas G. Anderson

[57] ABSTRACT

An internally supported composite filter having a wire-like frame, two confronting sheets of filter media secured to the frame, a ring of adhesive at the center of the sheets secures their confronting faces together in a relatively uncompacted fashion, and a handle secured to the sheets proximate one of the corners of the frame which can be grasped by a workman to remove the filter from the mounting structure in a peel-away fashion.

5 Claims, 3 Drawing Figures

INTERNALLY SUPPORTED FILTER

BACKGROUND OF THE INVENTION

1. Field of the Invention

The present invention relates to gas separation devices and in particular to air filters having handles to aid in the installation and removal of the filters from the filter installation.

2. Description of the Prior Art

The prior art is exemplified by U.S. Pat. No. 4,255,175 which discloses an internally supported composite filter provided with a handle secured in the center of the filter which can be grasped by a workman when installing or removing the filter from a filter installation. While this arrangement has been found to be particularly convenient when installing the filter in an overhead or similar installation, experience has shown that in some applications the filter tends to bow and pop-out of the mounting structure of the installation if it is hurriedly removed by the workman. This causes the dirty particulate materials which have collected on the filter to be dislodged or shaken off the filter as the workman removes it from the installation. As a result, the dirty materials can fall into the downstream side of the filter installation and contaminate the gas stream on the downstream side of the filter. Thus, while it is desirable to provide a relatively inexpensive and easily handled filter, it is also desirable to provide an arrangement which minimizes shaking of the filter media as the filter is removed from the installation.

SUMMARY OF THE INVENTION

The present invention relates to an internally supported composite filter and in particular to a disposable composite filter having a handle enabling it to be removed from the mounting structure of a filter installation.

The composite filter includes a thin wire-like frame, two confronting sheets of filter media having substantially the same peripheral shape as the frame which is positioned between the sheets inwardly of their outer peripheries, a ring or ribbon of adhesive at the center of the sheets securing their confronting faces together in a relatively uncompacted fashion, and a handle connected with the sheets proximate one of the corners of the frame which is adapted to be grasped by a workman to accommodate removing the filter from the mounting structure in a peel-away fashion to minimize shaking of the filter when a workman removes it from the mounting structure.

From the foregoing, it can be seen that the invention provides a relatively inexpensive and easily assembled filter arrangement which minimizes the chances of contamination during replacement of the filter while at the same time providing a filter wherein the entire surface area of the filter media can be utilized to filter the gas stream. However, it is to be understood that various changes can be made in the arrangement, form and construction of the apparatus disclosed herein without departing from the spirit and scope of the invention.

DESCRIPTION OF THE PREFERRED EMBODIMENT

Figure 1:
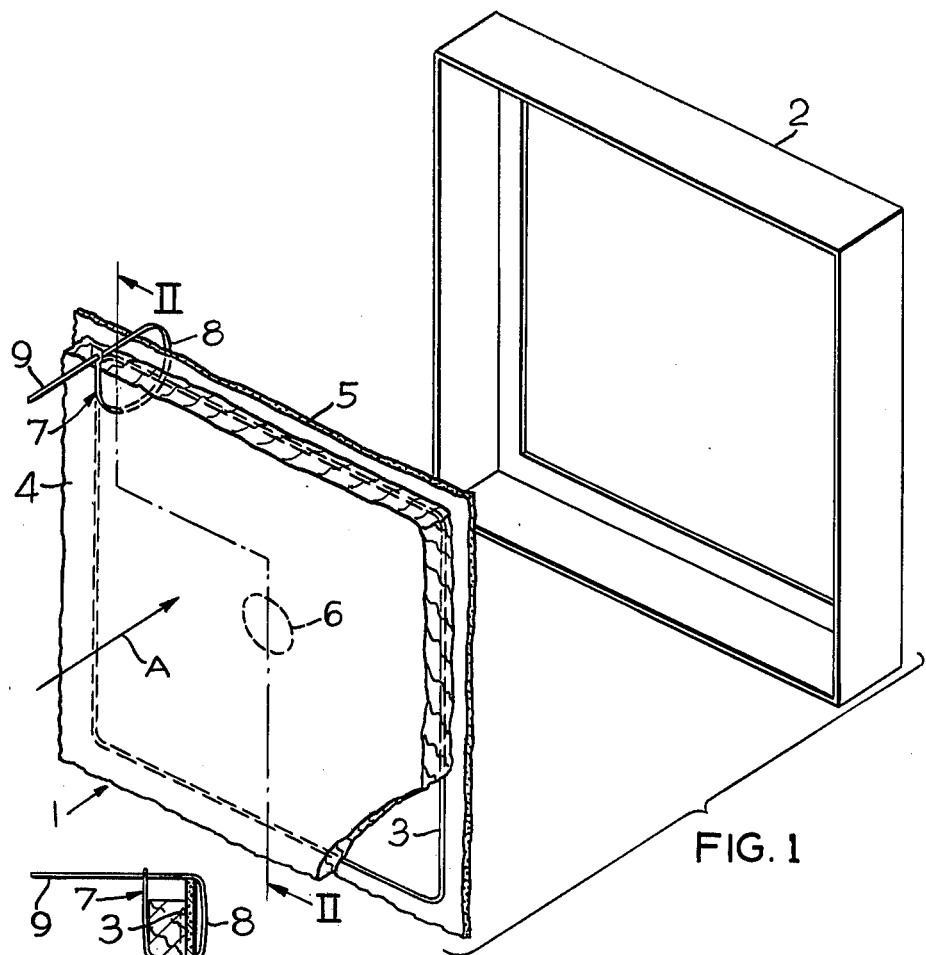
FIG. 1 is an exploded isometric view showing the composite filter removed from the filter mounting structure frame.

As shown in FIG. 1, the internally supported composite filter 1 embodying the invention can be removably secured in a filter mounting frame or structure 2 to separate particulates out of a gas stream as the gas stream passes through the filter as indicated by the arrow "A". As will be described, the filter 1 includes a flow-through frame 3, two confronting sheets of filter media 4 and 5 having substantially the same peripheral shape as the frame 3 which is positioned between the sheets inwardly of their outer peripheries, a ring or ribbon of adhesive 6 proximate the center of the sheets 4 and 5 securing the confronting faces of the sheets together in a relatively uncompacted fashion, and a handle or tab 7 secured to the sheets proximate one of the corners of the frame 3.

The flow-through frame 3 is a closed loop of rigid material such as a metal wire. The frame 3 is illustrated as being rectangular in peripheral shape although it may be of a variety of other shapes such as circular. In practice, the peripheral shape of the filter 2, and thus the frame 3, is determined by the configuration of the installation in which the filter is to fit.

The two sheets of filter media 4 and 5 are disposed in confronting relationship with the flow-through frame 3 embedded at the interface of the sheets. In the embodiment shown, the sheet 4 is formed of a relatively thick layer of puffed fiberglass positioned on the upstream side of the filter, and the sheet 5 is formed of a thinner layer of synthetic fabric such as a non-woven polyester on the downstream side of the filter. While two sheets or layers of filter media are shown in the drawings, it is to be understood that the number of layers selected, as well as the type of media used, is a function of the particular contaminants to be removed from the gas stream and the nature of the gas steams itself.

The sheets 4 and 5 are attached to the flowthrough frame 3 by a latex-type adhesive which may be applied to either the frame or the media. However, the sheets can be attached to the flow-through frame by any one of a variety of conventional methods. For example, if the sheets 4 and 5 contain a thermoplastic material they can be attached to the frame 3 by heat sealing.

As shown in the drawings, the confronting faces of the filter sheets 4 and 5 are secured together by a small ring or ribbon of the adhesive 6 at the center of the sheets. This prevents bulging or relative movement between the sheets during filtering operations which would tend to dislodge the accumulated particulates in the filter media which would in turn migrate through the filter and contaminate the gas stream downstream from the filter. This arrangement has been found to be particularly desirable since none of the filter media is compacted or compressed when the sheets are secured together so that the entire surface of each of the sheets is available to filter the gas stream.

As noted above, a handle or tab 7 is secured to the sheets 4 and 5 proximate one of the corners of the frame 3 which can be grasped by a workman to remove the filter from the mounting structure. The handle 7, which is formed from a flexible plastic cord or strip which may be tied or provided with a fastener such as that provided for the electrical cable ties sold by the All State Plastic Manufacturing Company, Inc., under the trademark Rap-Tight, is provided at one end with a loop 8 which is threaded through the filter sheets 4 and 5 and looped about the edge of the filter so that it encircles the frame 3, it being noted that the loop 8 is sized so that it does not compress the filter media during filtering operations. This arrangement allows a workman to remove the filter 1 from the mounting structure 2 by grasping the free end 9 of the handle 7 and pulling it outwardly to pivot the filter about the sides of the filter opposite the handle in a relatively continuous motion. Thus, the filter is essentially peeled-out of the mounting structure in a smooth continuous movement which minimizes shaking of the filter media due to the filter binding in the mounting frame as it is removed. In this regard, it is to be understood that although the handle is secured to the corner of the filter to provide the workman with the greatest mechanical advantage as it is removed, the handle may be secured to the filter at any point along its periphery to obtain the peel-away removal feature characterizing the arrangement.

Figure 2:
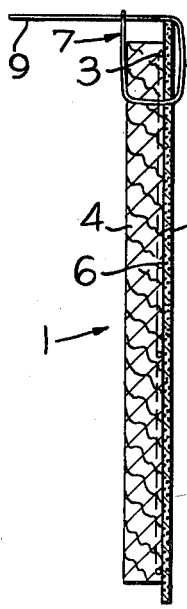
FIG. 2 is a cross-sectional view taken substantially along line II—II in FIG. 1; and, FIG. 3 is an enlarged cross-sectional view similar to FIG. 2 of an alternative embodiment.
Figure 3:
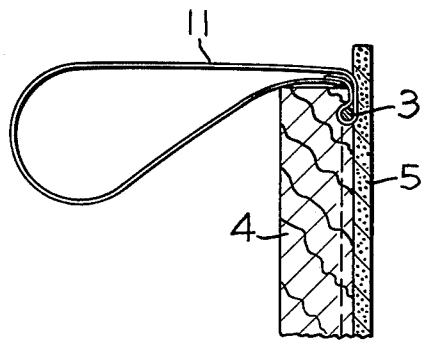

Referring to FIG. 3, wherein like numerals designate elements similar to those shown in FIGS. 1 and 2, that drawing shows an alternative construction wherein a handle 11 is affixed directly to the frame 3. In that arrangement, the handle 11 can be a flexible plastic tie similar to that provided in the first embodiment, or alternatively, a strip of nylon cloth or the like looped about the frame with its ends glued or stapled together prior to affixing the filter sheets to the frame as noted above. As in the case of the first embodiment, it should be noted that the handle 11 does not compress or otherwise interfere with the filter media during filtering operations.

From the foregoing, it can be seen that the invention provides a relatively inexpensive and easily assembled filter arrangement which substantially reduces the chances of contaminating the gas stream downstream from the filter during removal and replacement of the filter, while at the same time providing a filter wherein the entire surface area of the filter media can be utilized to filter the gas stream.

The embodiments of the invention in which an exclusive property or privilege is claimed are defined as follows:

1. An internally supported composite filter having a single handle adapted to be removably secured in a flow-through mounting structure for separating particulate materials from a gas stream flowing through the mounting structure, comprising:
    a closed loop of relatively rigid material forming a thin wire-like frame having a pair of opposing side portions;
    two confronting sheets of filter media having substantially the same peripheral shape as said frame and being secured thereto, said frame being positioned between said sheets inwardly of their outer peripheries;
    fastening means securing said sheets together in a relatively uncompacted fashion proximate the center of the sheets to retard bulging of the filter during filtering operations; and
    said handle being formed of a flexible strip, said handle having one end secured to one of said side portions and a free end adapted to be grasped by a workman to accommodate removing the filter by pulling the strip which causes the filter to pivot about the other side portion to peel it out of the mounting structure in a pivotal sliding fashion, thereby essentially minimizing shaking of the filter when the workman removes it from the mounting structure.

2. The composite filter according to claim 1, and said frame being of a generally rectangular configuration.

3. The composite filter according to claim 1, and said fastening means being a ribbon of glue bonding the confronting faces of said sheets together.

4. The composite filter according to claim 1, and said one end forming a loop passing through said sheets and encircling said frame to loosely secure the strip to the sheets.

5. The composite filter according to claim 1, and said handle extending from the frame to the peripheral edge of the filter media between the two confronting sheets of media.

* * * * *